United States Patent
Müntnich et al.

(10) Patent No.: US 6,421,917 B1
(45) Date of Patent: Jul. 23, 2002

(54) METHOD FOR PRODUCING A CAGE FOR A CYLINDRICAL ROLL BARREL

(75) Inventors: Leo Müntnich, Aurachtal; Jürgen Lechner, Dachbach; Volker Ploetz, Herzogenaurach, all of (DE)

(73) Assignee: Ina Walzlager Scaeffler oHG (DE)

( * ) Notice: Subject to any disclaimer, the term of this patent is extended or adjusted under 35 U.S.C. 154(b) by 0 days.

(21) Appl. No.: 09/508,721
(22) PCT Filed: Jun. 25, 1998
(86) PCT No.: PCT/EP98/03889
§ 371 (c)(1), (2), (4) Date: Mar. 28, 2000
(87) PCT Pub. No.: WO99/14002
PCT Pub. Date: Mar. 25, 1999

(30) Foreign Application Priority Data

Sep. 15, 1997 (DE) .......................... 197 40 435

(51) Int. Cl.[7] .............................................. B21K 53/12
(52) U.S. Cl. ..................................... 29/898.067; 29/557
(58) Field of Search ..................... 29/898.067, 898.064, 29/898.065, 557

(56) References Cited

U.S. PATENT DOCUMENTS

| | | | |
|---|---|---|---|
| 3,114,960 A | | 12/1963 | Einaudi |
| 3,144,703 A | * | 8/1964 | Einaudi et al. ............ 29/148.4 |
| 3,202,467 A | * | 8/1965 | Eckstein ................... 308/217 |
| 3,228,090 A | * | 1/1966 | Schaeffler ................ 29/148.4 |
| 3,251,118 A | * | 5/1966 | Pitner ..................... 29/148.4 |
| 3,797,083 A | * | 3/1974 | Schaeffler et al. ...... 29/148.4 C |
| 3,877,555 A | * | 4/1975 | Rist ............................ 192/45 |
| 3,992,764 A | | 11/1976 | Serasio |
| 5,335,416 A | * | 8/1994 | Alling .................... 29/898.067 |
| 5,410,809 A | * | 5/1995 | Alling .................... 29/898.067 |
| 5,862,592 A | * | 1/1999 | Harimoto et al. ...... 29/898.067 |

FOREIGN PATENT DOCUMENTS

| | | |
|---|---|---|
| DE | 1452703 | 5/1969 |
| DE | 2147170 | 3/1973 |
| DE | 2441810 | 3/1976 |
| DE | 19654584 | 7/1997 |
| GB | 931318 | 7/1963 |

* cited by examiner

Primary Examiner—David P. Bryant
(74) Attorney, Agent, or Firm—Bierman, Muserlian and Lucas

(57) ABSTRACT

A method of making a cage whose crossbars (3) connecting the side rings (1,2) are profiled whereby the rolling elements (5) are retained individually on both sides of the pitch circle by retaining edges (12,13) extending parallel to the axis of the rolling elements wherein by an additional shaping by material displacement after the punching out of the pockets (4), parallel opposing guide surfaces (11) for the rolling elements (5) are formed within the pitch circle between the retaining edges (12,13) of the pockets (4) and the retaining edges (12,13) on both sides of the pitch circle are dimensioned so that the distance between them in the peripheral direction is only slightly smaller than the diameter of the rolling elements (5) wherein a defined contact of the rolling elements (5) with the cage is achieved due to the stamp guide surfaces (11) so that the mechanical loading of the cage is insignificant.

2 Claims, 2 Drawing Sheets

METHOD FOR PRODUCING A CAGE FOR A CYLINDRICAL ROLL BARREL

This application is a 371 of PCT/EP98/03889 filed Jun. 25, 1998.

FIELD OF THE INVENTION

The invention concerns a method of making a cage for cylindrical rolling elements and more particularly, a needle roller cage for a mounting of an idler pinion in a toothed gear variable transmission, side rings of the cage being connected to each other by crossbars forming pockets, the crossbars being profiled so that the rolling elements are retained individually on both sides of the pitch circle by retaining edges extending parallel to axes of the rolling elements, the method comprising giving a sheet metal strip the desired profiled cross-section by chipless shaping forming the crossbars in the central region of the profiled strip by punching before the strip is bent round and, if necessary, connecting its abutting ends to each other.

BACKGROUND OF THE INVENTION

A method of the pre-cited type for making such a cage is known from DE-OS 21 47 170. In this known method, a flat sheet metal strip is first given the desired cross-sectional profile by rolling, the pockets for the reception of the rolling elements are punched out either before or after the profiling and, finally, the strip is bent round and, if necessary, the abutting ends are welded to each other.

In such thin-walled, bent profiled cages of an M or W shape, the rolling element are retained by retaining edges arranged inside and outside of the pitch circle. The cages are made of thin-walled sheet metal because the small wall thickness enables a particularly economic fabrication of the pockets by punching. This however, has the drawback that punching fissures and generally rough punched surfaces are formed on the crossbars, i.e. the guide surfaces for the rolling elements are rough and imprecise on the whole. But rough surfaces when contacted by the needle rollers cause wear. Imprecise crossbar surfaces, in their turn, lead to axial thrust loading and axial abutting of the cage end faces against the axial limiting faces of the bearing under considerable surface contact pressure. The result of this in the case of the mounting of an idler pinion in mechanical transmissions can be that the idler pinion bearing is subject to considerable transverse or displacing forces and tends to wobble. Another drawback results from the fact that the pockets are punched out before the cage strip is bent round. In the finished cage, the pockets then present a V-shaped profile toward the center point of the bearing so that the danger of binding of the rolling elements exists.

SUMMARY OF THE INVENTION

The object of the invention is therefore to provide a method of making a profiled M or W cage in which the danger of lateral transverse or lateral displacing forces is reliably eliminated.

The invention achieves this object according to the characterizing part of Claim 1 by the fact that, by an additional shaping by material displacement after the punching out of the pockets, on the one hand, parallel opposing guide surfaces for the rolling elements are formed within the pitch circle between the retaining edges of the pockets, and on the other hand, the retaining edges on both sides of the pitch circle are dimensioned so that the distance between them in peripheral direction is only slightly smaller than the diameter of the rolling elements.

By this additional shaping step, also known to the person skilled in the art by the name of stamping, the cage pocket is pressed by material displacement into the shape required for a precise functioning of the cage. This means in the first place that the rolling elements are in contact with the cage in the region of the pitch circle and not, as was hitherto the case, inside or outside of the pitch circle. By this guidance in the region of the pitch circle which is achieved by the parallel guide surfaces of the pockets, the undesired transverse or displacing forces on the cage are avoided.

Another advantage of stamping is that the guide surfaces thus obtained are smooth and free of punching fissures and are additionally work-hardened at the same time. This prevents wear between the cage and the rolling elements. The exact contact of the rolling elements in the region of the pitch circle of the cage permits the use of a thicker starting strip, i.e. the stability of the cage is substantially enhanced.

A further advantage of stamping is that the retaining edges are dimensioned so that the distance between them is only slightly smaller than the diameter of the rolling elements. This allows a resilient displacement of the rolling elements into the pockets in the elastic region so that damage to the retaining edges or to the rolling surfaces of the rolling elements is reliably prevented.

Stamping is performed according to claim 2 in that one or more stamping tools are introduced into adjacent pockets and loaded by a force in peripheral direction so that the crossbar separating the two pockets is plastically deformed on both sides.

This is done in a known manner in that the crossbar is subjected to pressure its axial length from both sides by a stamping tool having a contour corresponding to the desired contour of the targeted guide surface and of the retaining edges of the crossbar. These stamping tools are then moved toward each other in peripheral direction so that a plastic displacement of material takes place in the region of the crossbar. A detailed description of this stamping procedure, known, per se, is not required here because its use with solid cages is already known and has been described in detail, for example, in DE-AS 11 45 126.

The invention will now be described more closely with reference to the following example of embodiment.

DETAILED DESCRIPTION OF THE DRAWINGS

Figure 1:
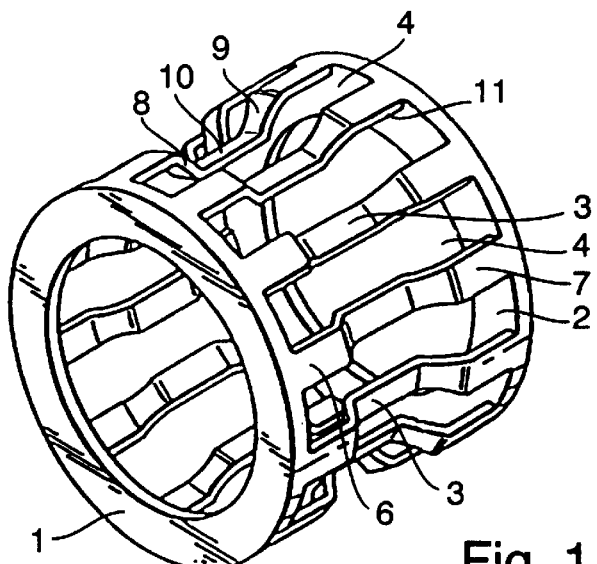
FIG. 1 is a perspective representation of an M cage according to the prior art.
Figure 2:
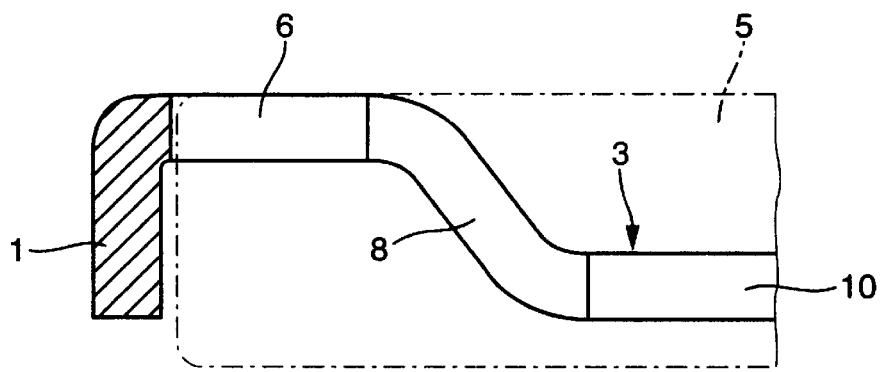
FIGS. 2 and 3 show a longitudinal section and a cross-section respectively, through a cage according to FIG. 1, and FIGS. 3 and 4 show a longitudinal section and a cross-section respectively, through an M cage according to the invention.
Figure 3:
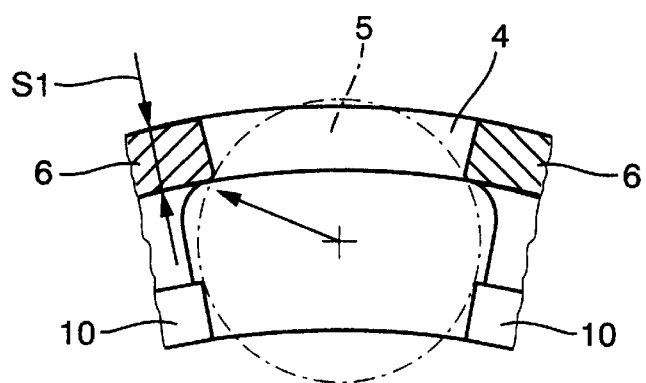

The prior art cage shown in FIGS. 1 to 3 comprises two side rings 1 and 2 which are connected to each other by a number of profiled crossbars 3 spaced uniformly around the periphery. The pockets 4 thus formed for the reception of rolling elements 5 are defined by the side rings 1 and 2 and by the crossbars 3. The crossbars 3 are bent angularly inwards through the rolling element pitch circle towards the center point of the bearing to form two sections 6 and 7 which start from the side rings 1 and 2 and extend parallel to the cage axis. The sections 6 and 7 are situated outside of the pitch circle and merge into sections 8 and 9 respectively, which are inclined to the cage axis and which, in their turn, unite to form a section 10 which is parallel to the cage axis and situated inside the pitch circle. The inner edges of the crossbar sections 10 limit the radial play of the rolling elements 5 in inward direction, while the radial play in outward direction is limited by the outer crossbar sections 6 and 7.

As can be seen in FIG. 3, due to the bending of the punched strip, the pockets 4 have V-shaped configuration. The rolling element 5 runs with its rolling surface on the inner edge of the crossbar sections 6 and 7 so that it is guided outside of the pitch circle with the initially described drawbacks. These unfavorable conditions in the bearing are shown in the drawing by an arrow pointing from the center of the rolling element 5 in the direction of the rolling surface.

Figure 4:
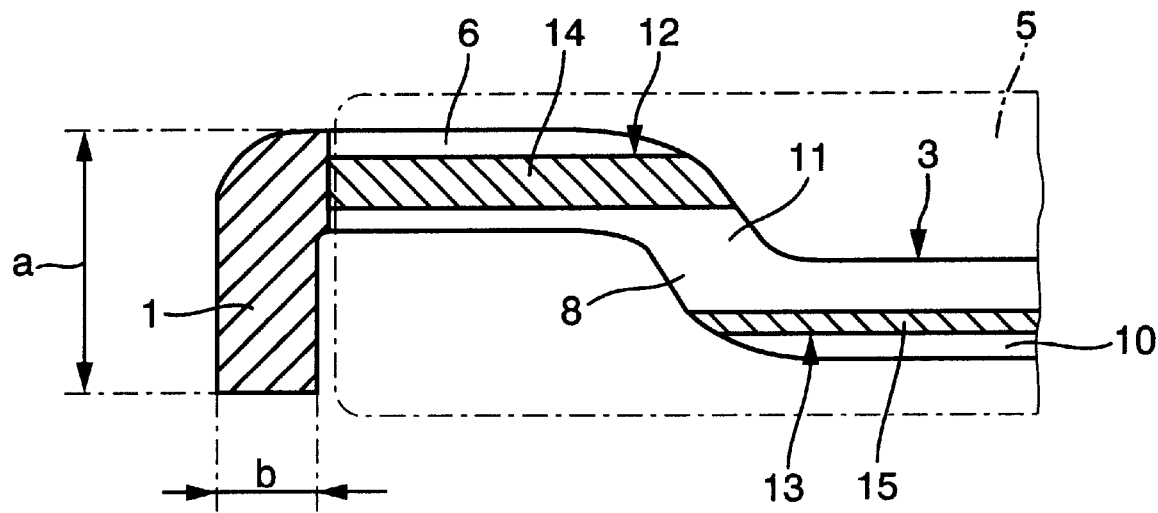
Figure 5:
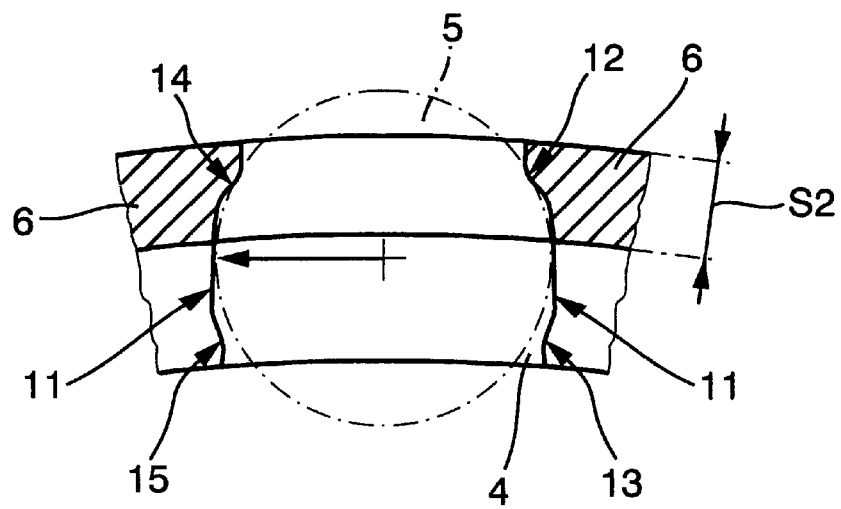

FIGS. 4 and 5 show the stamped pocket 4 of the invention. It can be seen that two opposing, radially parallel guide surfaces 11 are formed on which the rolling elements run, said guide surfaces being defined by the retaining edges 12, 13 and by guide surfaces 14 and 15 high-lighted in black. Thus the bearing comprises the desired and exactly defined guide surfaces 11 which assure a low mechanical loading of the cage. The favorable conditions of guidance are shown in FIG. 5 by an arrow which extends from the central point of the rolling element 5 along the pitch circle in peripheral direction toward the guide surface 11. It can be seen further that due to the axially parallel guide surfaces 11, the pockets 4 are not V-shaped. A comparison of FIG. 5 with FIG. 3 shows clearly that the solution of the invention permits the use of a sheet thickness S2 which is larger than S1, i.e. the cage has an improved stability. Advantageously, the ratio of the radial dimension 'a' of the side rings 1, 2 of the cage to their axial dimension 'b' $\geq$1.5:1 and the sections 6 and 7 have a larger profile thickness than the section 10.

What is claimed is:

1. A method of making a needle roller cage for cylindrical rolling elements, for a mounting of an idler pinion in a toothed gear variable transmission, side rings of the cage being connected to each other by crossbars forming pockets, the crossbars being profiled so that the rolling elements are retained individually on both sides of a pitch circle by retaining edges extending parallel to axes of the rolling elements, the method comprising forming a sheet metal strip with a desired profiled cross-section by shaping without chip removal, forming the crossbars in a central region of the sheet metal strip by punching before the strip is bent round and, optionally, connecting its abutting ends to each other, characterized in that, after the punching out of the pockets, parallel opposing guide surfaces for the rolling elements are formed within the pitch circle between the retaining edges of the pockets by an additional shaping by material displacement, and the retaining edges on both sides of the pitch circle are dimensioned so that the distance between them in peripheral direction is only slightly smaller than the diameter of the rolling elements.

2. The method of claim 1, wherein at least one stamping tool is introduced into adjacent pockets and loaded by a force in peripheral direction so that the crossbar separating the two pockets is plastically deformed on both sides.

\* \* \* \* \*